(12) United States Patent
Naylor

(10) Patent No.: US 8,688,881 B2
(45) Date of Patent: Apr. 1, 2014

(54) ARBITRATION IN MULTIPROCESSOR DEVICE

(75) Inventor: Rowan Nigel Naylor, Basingstoke (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 407 days.

(21) Appl. No.: 13/131,687

(22) PCT Filed: Nov. 23, 2009

(86) PCT No.: PCT/EP2009/065640
§ 371 (c)(1),
(2), (4) Date: Jun. 15, 2011

(87) PCT Pub. No.: WO2010/060882
PCT Pub. Date: Jun. 3, 2010

(65) Prior Publication Data
US 2011/0238877 A1    Sep. 29, 2011

(30) Foreign Application Priority Data
Nov. 28, 2008 (EP) ..................... 08170290

(51) Int. Cl.
*G06F 12/00* (2006.01)
(52) U.S. Cl.
USPC ............ 710/243; 710/240; 710/242; 710/244
(58) Field of Classification Search
USPC ................................ 710/240–244
See application file for complete search history.

(56) References Cited

U.S. PATENT DOCUMENTS

| | | | | |
|---|---|---|---|---|
| 6,141,713 A * | 10/2000 | Kang | ............. | 710/107 |
| 7,051,135 B2 * | 5/2006 | Zhu | ............. | 710/116 |
| 7,080,177 B2 * | 7/2006 | Neuman | ............. | 710/240 |
| 7,120,714 B2 * | 10/2006 | O'Connor et al. | ............. | 710/243 |
| 7,143,219 B1 * | 11/2006 | Chaudhari et al. | ............. | 710/111 |
| 7,149,829 B2 * | 12/2006 | Weber et al. | ............. | 710/243 |
| 7,200,699 B2 * | 4/2007 | Bose et al. | ............. | 710/120 |
| 7,478,183 B2 * | 1/2009 | Pathak et al. | ............. | 710/116 |
| 7,631,131 B2 * | 12/2009 | Chen et al. | ............. | 710/243 |
| 7,664,901 B2 * | 2/2010 | Riocreux et al. | ............. | 710/244 |
| 7,673,087 B1 * | 3/2010 | Ansari et al. | ............. | 710/241 |
| 7,710,996 B1 * | 5/2010 | Damaraju et al. | ............. | 370/461 |
| 7,734,856 B2 * | 6/2010 | Reinig et al. | ............. | 710/243 |
| 7,797,476 B2 * | 9/2010 | Gupte et al. | ............. | 710/317 |
| 7,913,016 B2 * | 3/2011 | Wei et al. | ............. | 710/244 |
| 7,930,456 B1 * | 4/2011 | Davis | ............. | 710/120 |
| 2004/0210695 A1 | 10/2004 | Weber et al. | | |
| 2005/0240707 A1 | 10/2005 | Hayashi et al. | | |
| 2007/0174529 A1 * | 7/2007 | Rodriguez et al. | ............. | 710/240 |
| 2008/0059674 A1 * | 3/2008 | Shi et al. | ............. | 710/243 |

* cited by examiner

*Primary Examiner* — Brian Misiura
(74) *Attorney, Agent, or Firm* — Coats and Bennett PLLC

(57) ABSTRACT

An integrated circuit device (100) comprising a first plurality of components (102-112), a second plurality of buses (114-124, 140, 142) for transmitting transaction requests from said components (102-112) to a resource (138) shared by said components (102-112) and a third plurality of arbiters (132-136) arranged in at least two levels of arbitration. Each transaction request has attached priority value that is used by the arbiters to determine which of the components should be granted access to the resource (138).

29 Claims, 6 Drawing Sheets

1 = highest importance
6 = lowest importance

1 = highest importance
6 = lowest importance

ARBITRATION IN MULTIPROCESSOR DEVICE

TECHNICAL FIELD

The present invention relates to multi-core embedded systems known as System On a Chip or Network On a Chip that contain a number of general and/or application specific processors accessing common resources in general, and in particular to arbitrating access requests in multiprocessor systems.

BACKGROUND

Modern single chip digital systems employ multiple processors, but, for cost reasons, a single external memory or other shared resource. Present generation System On a Chip and Network On a Chip (SOC, NOC) memory architectures use arbitration allowing and limiting access to common resources in an attempt to meet the needs of multiple consuming elements. The basic method used today is physical arbitration that is fixed or programmable and in some cases adaptive.

In a physical priority scheme at each multiplexing junction where multiple requesting bus sources come together to access a single bus resource an arbiter picks the highest priority requesting source and gives it access to the resource. This system is referred to as physical because of the method it uses—each requesting source is assigned a priority, either statically (i.e. fixed), or programmable, at the junction and this is used to decide between multiple active requesting sources. A physical bus is assigned the priority irrespective of the originating source of the request, and only on the bus present at the point of arbitration.

Looking at the bus physical structure and all possible routes between sources of requests and resources, while it is possible to generate routes of higher importance than others, it is also possible to generate routes where the importance varies along the length of the route, which leads to the risk of priority inversion and, in consequence, to deadlocks. The usual solution is to use an arbitration algorithm like round-robin to avoid this problem at the cost of not being able to optimize the delays. This, in turn, forces the designer to implement additional redundancy in the application to cope with the wider delay variation which reduces efficiency.

An alternative solution tries to move the issues to the resource, here the requests are routed as fast as possible to the resource but not executed. At the resource the arbiter chooses the order in which the requests will be serviced then executes the request and responds back to the source of the request. This requires a complex bus architecture that allows pre-emption and expects that each junction or node in the bus fabric can retain outstanding requests. This method, although more complex, is still prone to the same hazards as the one previously described if the storage in the junction or nodes is full under high loads.

SUMMARY

It is the object of the present invention to obviate at least some of the above disadvantages and provide an improved integrated circuit device implementing an improved method of arbitration of requests to access a shared resource.

Accordingly, the invention seeks to preferably mitigate, alleviate or eliminate one or more of the disadvantages mentioned above singly or in any combination.

According to a first aspect of the present invention there is provided an integrated circuit device comprising a first plurality of components, a second plurality of buses for transmitting transaction requests from said components to a resource shared by said components and a third plurality of arbiters. The arbiters are arranged in at least two levels of arbitration. The components are connected in groups to assigned arbiters of a first level and the arbiters of the first level are connected in groups to at least one arbiter of a second level. Each transaction request has an associated priority value. The arbiters are adapted to forward after arbitration winning transaction requests to an arbiter of a next level, wherein an arbiter of a last level is adapted to forward a winning transaction request to the resource.

According to a second aspect of the present invention there is provided a method of controlling access to a resource in an integrated circuit device. The integrated circuit device comprises a first plurality of components. The components share access to said resource and transmit transaction requests, wherein each transaction request has an associated priority value. The device also comprises a third plurality of arbiters organised in at least two levels of arbitration. The method comprises receiving by arbiters of a first level transaction requests from components said arbiters are assigned to. Priority values received with each transaction request are then compared and the winning transaction requests with their priority values are forwarded for arbitration to at least one arbiter of a second level, wherein the arbiters forward after arbitration winning transaction requests to an arbiter of a next level. An arbiter of a last level forwards a winning transaction request to the resource.

The advantage of the present invention is that it simplifies the arbiter, which is a significant benefit because the ever more complex SOC/NOC devices comprise large numbers of arbiters.

In its simplest implementation the arbiters do not require any programming which simplifies their logic and the management of the system. In a more advanced implementation each arbiter can be individually programmed to one of four modes. These modes use simple logic and can be fixed at reset.

The use of the system wide scheme prevents deadlock and priority inversion hazards irrespective of the setup, which improves stability and lowers the risk of faults.

The present invention allows for better control of the system and distributes said control to separate processors rather than centralizing it. This, in turn, reduces the overhead compared to the known methods and devices.

BRIEF DESCRIPTION OF THE DRAWINGS

The present invention will be understood and appreciated more fully from the following detailed description taken in conjunction with the drawings in which.

DETAILED DESCRIPTION

The present invention in its various embodiments is applicable to controlling access to a shared resource in a multiprocessor device in which arbiters grant access based on priority values associated with transaction requests.

The term "component" used in this document refers to any element in the device that is capable of requesting access to the shared resource. It includes, but is not limited to, microprocessors also referred to as CPUs (Central Processing Units) or general purpose processors, application specific processors, for example digital signal processors (DSPs), hardware accelerators as well as processors having more than one bus and in effect being more than one requesting source.

It is also possible that a request to access a shared resource (a transaction request) is generated by an application run on a processor or a thread in the application. In the case of several applications run on one processor or several threads of one application it is possible that more than one application or more than one thread run on the processor can generate a transaction request. In this situation there may be a plurality of transaction requests originating from one processor.

One or more embodiments herein attach priority values to all transaction requests generated in the device and transmitted on the buses of the device towards the resource. Once a priority value is attached to a particular transaction request it stays at the same level until the transaction is completed and is used by all arbiters on its route to the shared resource or even by the shared resource in some embodiments.

Figure 1:
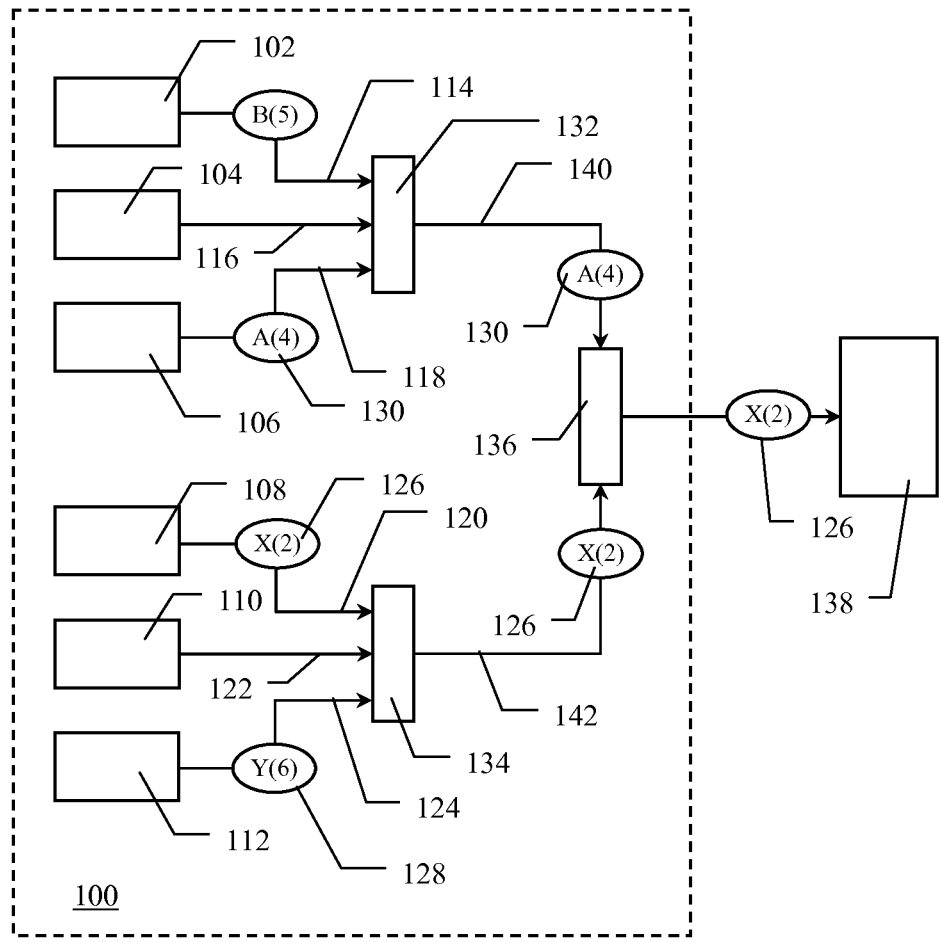
FIG. 1 is a diagram illustrating an integrated circuit device in one embodiment of the present invention.

With reference to FIG. 1 an integrated circuit device 100 in accordance with one embodiment of the present invention is presented. The device 100 comprises a first plurality of components 102-112. In one embodiment the components are connected in groups 102-106 and 108-112 to their assigned arbiters 132, 134 via busses 114-124. The grouping of the components in one embodiment is based on their functional relationship (e.g. components responsible for generating graphics are grouped together). As shown in the drawing the processor 102 is connected via bus 114 to an arbiter 132. The arbiter 132 is an arbiter of a first level. Similarly processor 104 uses bus 116 and processor 106 uses bus 118 to connect to the arbiter 132. Similar situation is illustrated for the second group of processors 108-112 that use buses 120-124 to connect to the arbiter 134 (also an arbiter of the first level).

Elements 126 and 128 in FIG. 1 show transaction requests X and Y. These transaction requests are generated by the processors 108 and 112 and have attached respective priority values 2 and 6. A priority value is transmitted in the same way as address in a transaction request and accompanies any component of the transaction that needs separate arbitration. The priority value shown in FIG. 1 and discussed in the above embodiment is very much simplified. In alternative embodiments the priority value is more complex allowing for more complex arbitration.

The device 100 comprises a number of arbiters 132-136, which are arranged in at least two levels of arbitration as shown in FIG. 1. The arbiters of the first level 132, 134 are connected to an arbiter of a second level 136. In the case of a large number of components requesting access to the shared resource 138 the arbiters of one level can be grouped and connected in groups to arbiters of a next level. The arbiters 132-134 are adapted to forward, after arbitration, winning transaction requests to an arbiter of a next level 136. In the embodiment illustrated in FIG. 1 the device has two levels of arbitration, but it is clear that the invention is also applicable to devices having more than two levels of arbitration. In the embodiment illustrated in FIG. 1 the arbiter of the second level, i.e. arbiter 136 is also an arbiter of the last level of arbitration and it forwards a winning transaction request to the resource 138. The arbiter 136 of the second level of arbitration is illustrated as having two inputs, but in alternative embodiments arbiters on all levels can have more than two inputs.

Figure 5:
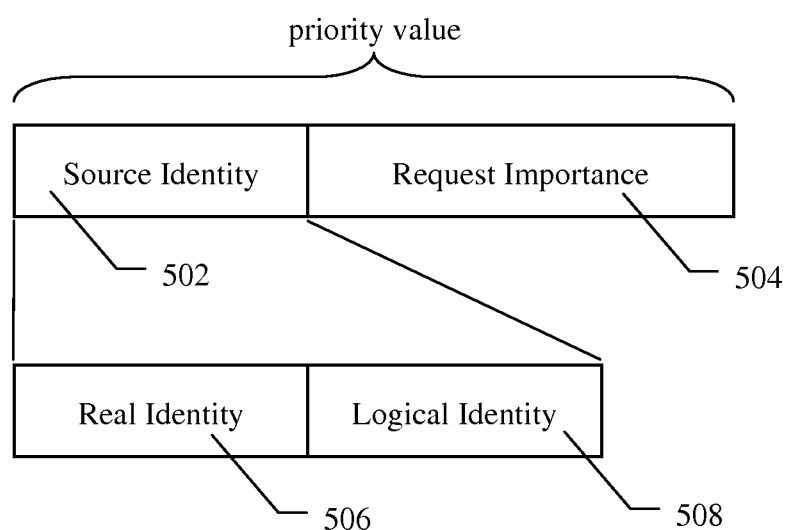
FIG. 5 illustrates priority value data field in one embodiment of the present invention.

In one embodiment the priority value associated with any transaction request is made up of two parts as illustrated in FIG. 5.

The Request Importance 504 is a value applied system-wide and is used to place the importance of a particular request (represented by an importance value) to which the priority value is attached. Its size depends on the number of levels the system requires to uniquely place all transaction types.

The Source Identity 502 is an identifier of the originating source of the request and can be that of a physical piece of hardware (a component) or a process thread running on a component.

The source identifier 502 contains two fields, a real identity 506 and a logical identity 508. The real identity 506 is the identity of the component that generated the request, and the logical identity 508 is a sub-code for an application, a thread or a function run within the component that needs to be identified separately.

The device 100 comprises a large population of components 102-112 that can generate transaction requests on the bus fabric. As explained, some of those components can generate requests of different importance from the same source. To handle such a large number of requests the device 100, in one embodiment, uses a table called System Priority Space, which lists all possible levels of importance of tasks arranged in order, highest to lowest. The Request Importance 504 field in a priority value of any request must have a value taken from said System Priority Space. As a result a request (or rather its priority value) can be compared against any other request. The order of this list applies to every point of arbitration in the bus fabric. In one embodiment the level of importance is represented as a binary value, and the process of comparing of two or more requests is comparing their respective binary values. In one embodiment the list includes a task identity (source of transaction), priority value of the physical link and importance value of the logical transaction to the system. For a particular transaction the importance value to be used in the Request Importance field 504 is found by selecting first the particular task identity and then priority value of the physical link on which the transaction is to be transmitted.

Each component of the device 100 may have one or more bus ports and each bus port is a source of transaction requests. A port is therefore an interface between a component and a bus and issues transactions onto the bus for the component. Some components such as video accelerators may have a function which is linked to only that component, others, such as CPU's, may have functions that depend on the application thread that is being executed on said processor. Each function in all cases can generate a bus transaction and therefore is a source of transaction requests and has its own identity. To differentiate between various sources of transaction requests, in one embodiment, in the device 100 there is maintained a list of these identities arranged in an order of significance to the system and said list is referred to as System Source Space. For example, a video accelerator has a single source identity that may be higher than a CPU application running a timer function but lower than the same CPU running an OS (Operating System) function.

Any transaction request generated in the device 100 can be given a source identifier (placed in the field source identity 502 of the priority value) taken from said list that allows it to be compared against any other request. The order of this list applies to every point of arbitration in the bus fabric. In one embodiment the source identity 502 is represented as a binary value and a process of comparing of two or more requests is comparing their respective binary values.

Figure 2:
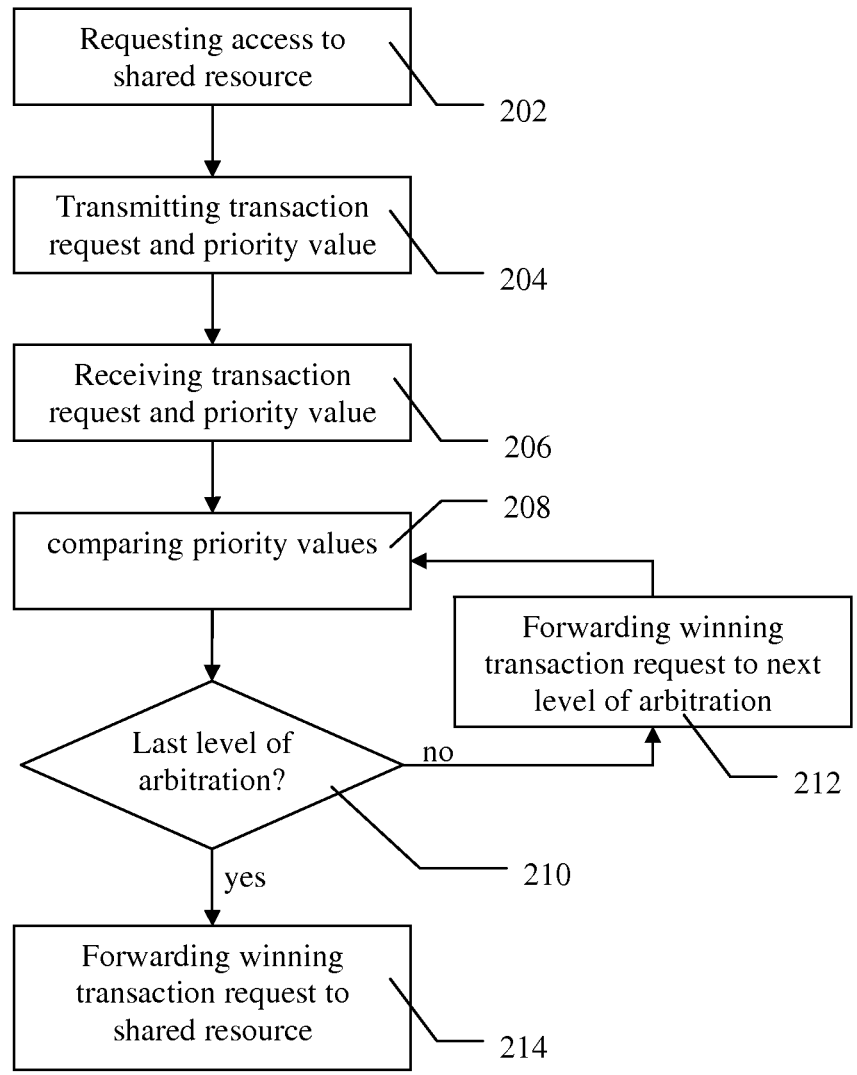
FIG. 2 is a flow chart illustrating a method of controlling access to a resource in an integrated circuit device in one embodiment of the present invention.

The method of controlling access to a shared resource is illustrated in various embodiments in FIGS. 2-4 and is described below with reference to the embodiment shown in FIG. 1. In this embodiment only values in the Request Importance fields 504 of the priority values are compared.

In operation, a plurality of components 102-112 of the device 100 generate 202 transaction requests that require access to a resource 138 shared by said components. The transaction request and its assigned priority value are transmitted 204 to an arbiter of a first level of arbitration. Two of the transaction requests 126 and 128 are received 206 by the arbiter of the first level, which in the embodiment shown in FIG. 1 is arbiter 134. In the next step the arbiter 134 compares 208 importance values received with each transaction request. The embodiment of FIG. 1 shows that elements 126 and 128 (i.e. transaction requests X and Y) have different importance values. Transaction request X (element 126) has importance value 2 and the transaction request Y (element 128) has importance value 6, wherein in this particular embodiment 1 denotes the highest importance and 6 denotes the lowest importance. In the next step the arbiter 134 forwards 212 the winning transaction request 126 along the bus 142 with its priority value for arbitration to an arbiter 136 of a second level. The arbitration is repeated at the second level as shown in FIG. 1, where the arbiter 136 received transaction requests 130 and 126 (i.e. the transaction requests A and X) on buses 140 and 142. If the arbiter of the second level is also the arbiter of the last level 210 it forwards 214 the winning request to the shared resource 138.

In a preferred embodiment the priority value comprises Source Identity and Request Importance fields as illustrated in FIG. 5 and the arbiters are programmed or configured to be in one of four basic modes of operation using either or both the Source Identity and Request Importance fields in the process of arbitration. Also preferably, each arbiter is programmed individually.

Level of Importance

An arbiter is programmed to ignore the Source Identity field 502 and simply compare the importance value taken from the Request Importance field 504 and select request with the highest importance value. Where the importance values are the same a round-robin or similar simple arbitration scheme is used.

Source Identifier

An arbiter is programmed to ignore the Request Importance field 504 and simply compare the Source Identity values and select the request with the highest authority (i.e. the one with highest position is the System Source Space). Where the Source Identity values are the same a round-robin or similar simple arbitration scheme is used. This, however, should be infrequent and only occur when a source has given the same identifier for two transactions originating from different bus ports.

Request Importance Priority

Figure 3:
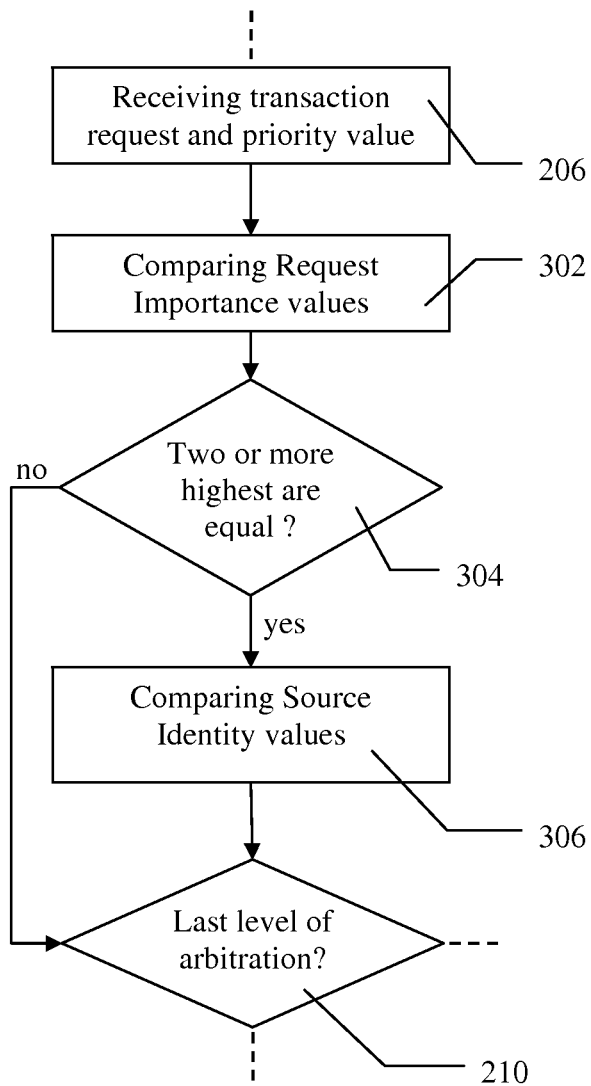
FIG. 3 is a flow chart illustrating in details selected steps of the method in one embodiment of the present invention.

This embodiment is illustrated in FIG. 3. Operation is the same as the Level of Importance operation (i.e. Request Importance values are compared 302) except the value of Source Identity field is used 306 to differentiate between two requests of the same importance values 304. Should these be the same then a standard fixed algorithm like round-robin is used. This can be used when a reduced set of importance values is used.

Source Identifier Priority

Figure 4:
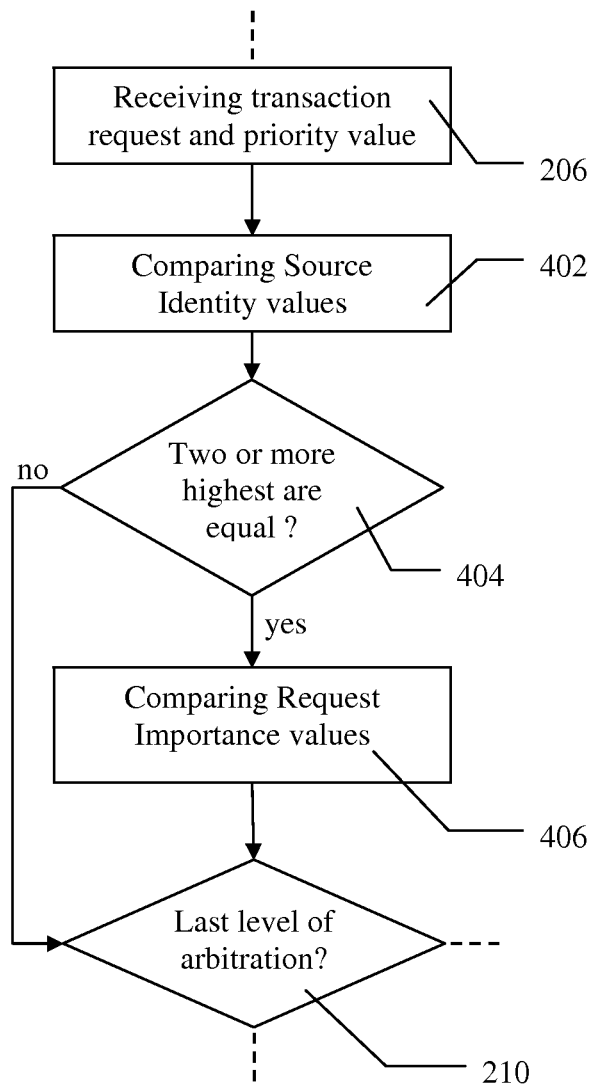
FIG. 4 is a flow chart illustrating in details selected steps of the method in an alternative embodiment of the present invention.

This embodiment is illustrated in FIG. 4. Operation is the same as the Source Identifier operation (i.e. Source Identity values are compared 402) except the value of Request Importance field is used 406 to differentiate between two requests from the same source 404. Should these be the same then a standard fixed algorithm like round-robin is used. This can be used when a source may have multiple bus ports or is capable of originating multiple requests.

It is important to note that the mode of operation of a particular arbiter in a device 100 is decided independently. In a preferred embodiment the mode of operation of an arbiter can even be changed during operation of the device, for example in response to the system behaviour.

As shown in FIG. 5 the source identifier 502 contains two fields, a real identity 506 and a logical identity 508. These two identities allow an individual arbiter to separate a physical device e.g. a CPU (real) from a task or process running on it (logical) where the physical devices could be grouped but running different tasks or the task is distributed over multiple physical devices. The system may monitor its performance and switch arbiter setups to different modes between set points to optimise the system.

The real and logical identifier fields provide additional functionality in that they allow the arbitration system to discriminate between request from a physical port and requests from function behind that port. This can be used in two ways.

Figure 6:
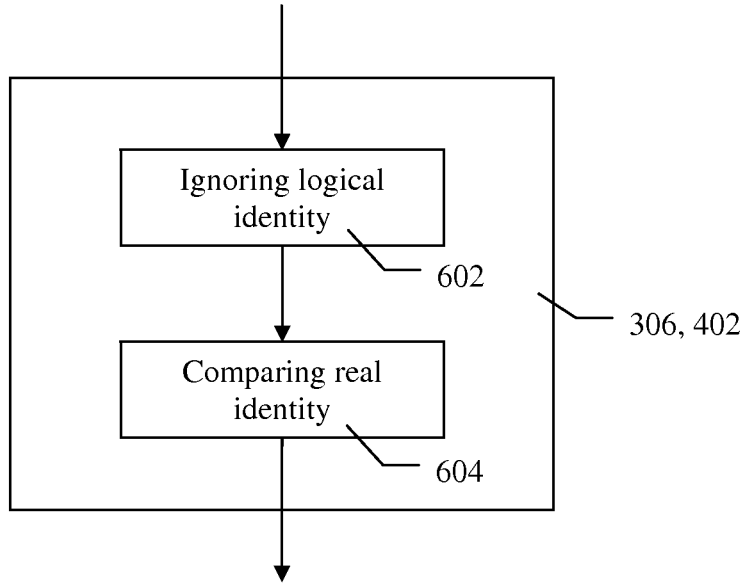
FIG. 6 and FIG. 7 illustrate two alternative embodiments of arbitration based on identity of the source of transaction request.
Figure 7:
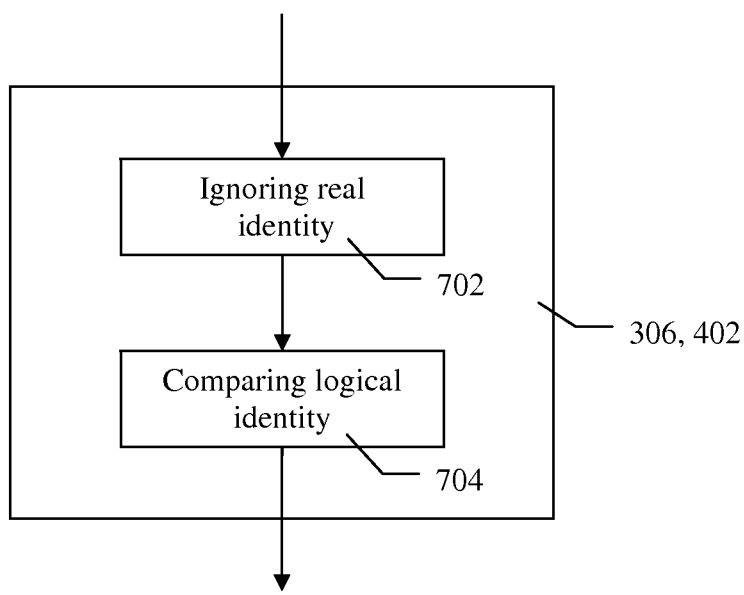

1. As illustrated in FIG. 6, by ignoring 602 the logical field 508 the arbiter can base the sharing on the quantity coming from components and compare 604 the Real Identity fields 506 to avoid a component taking over the resource for a long period of time by sending a large number of requests of different logical identity.
2. As illustrated in FIG. 7, by ignoring 702 the real field 506 the requests from the functions run on components may be arbitrated irrespective of the physical port they originated from by comparing 704 the Logical Identity fields 508. This, in turn, would allow requests from functions to be arbitrated on the same level as physical devices where the port and function are the same thing.

This operation is optional and can be applied in two places. First, the source originating the identifier can mask out either field on transactions without affecting the originating function. And secondly, it can also be implemented at an arbiter. In this implementation a filter may be applied to the output bus to all successful requests passed through. Here, depending on the required complexity, requests from sources can have the logical or real identifier re-set to a default value. This can be accomplished by recognizing the source identifier on arbitration and filtering the Priority Value as the request is passed on to set either field of the source identity 502 to a default value.

In yet another preferred embodiment the shared resource 138 is adapted to manage itself access to a further resources not directly visible to the components 102-112. This may happen in situations when the resource 138 appears to the device 100 and its components 102-112 as a single device where in fact it is a system comprising more than one device. In this situation the resource itself uses the received priority attached to the transaction request, which allows the transaction request to be further arbitrated within a subsystem of the shared resource 138.

The present invention is applicable and can be implemented in most existing bus architectures by increasing the address bus size to include the priority value and making use of its protocol. In the address decode operation the address section is decoded as normal and the priority section is fed to the arbiter.

The invention claimed is:

1. An integrated circuit device comprising:
   a plurality of components organized into a fixed plurality of distinct groups;
   a plurality of buses configured to transmit transaction requests from said components to a resource shared by said components, wherein each transaction request has an associated priority value; wherein the priority values comprise a field with an identity of a source of the transaction request and a field with an importance level value associated with the transaction request; and
   a plurality of arbiters configured to arbitrate between the transaction requests, based on the associated priority values, for access by the components to the resource;
   wherein the arbiters are arranged in at least two levels of arbitration;
   wherein each arbiter of a first level is connected to exactly one component group by at least one of the buses;
   wherein the arbiters of the first level are connected in groups to at least one arbiter of a second level;
   wherein an arbiter of any given level other than a last level is configured to forward, after arbitration, a winning transaction request to an arbiter of a next level; and
   wherein an arbiter of the last level is configured to forward a winning transaction request to the resource.

2. The device according to claim 1, wherein the components are grouped for connection to assigned arbiters based on their functional relationship.

3. The device according to claim 1, wherein the components are at least one of general purpose processors and application specific processors.

4. The device according to claim 1, wherein the transaction requests are generated by applications run on at least one of said components.

5. The device according to claim 4, wherein if one or more threads are executed by an application, then said one or more threads are configured to generate transaction requests.

6. The device according to claim 1, wherein an arbiter is configured to compare the importance level values associated with received transaction requests and to forward as the winning transaction request the transaction request with the highest importance level value.

7. The device according to claim 6, wherein, if there are at least two transaction requests with equal and highest importance level values, the arbiter is configured to compare the identities associated with the at least two transaction requests and to forward as the winning transaction request the transaction request with the identity most significant to the operation of the device.

8. The device according to claim 1, wherein an arbiter is configured to compare the identities associated with received transaction requests and to forward as the winning transaction request the transaction request with the identity most significant to the operation of the device.

9. The device according to claim 8, wherein, if there are at least two transaction requests with identities that are equal and of highest significance, the arbiter is configured to compare the importance level values associated with the at least two transaction requests and to forward as the winning transaction request the transaction request with the highest importance level value.

10. The device according to claim 8, wherein the field of the priority value for a transaction request that is associated with an identity comprises a real identifier field and a logical identifier field, wherein the real identifier field relates to a component of the device that generated the transaction request and the logical identifier field relates to an application thread run on that component.

11. The device according to claim 10, wherein the arbiter is configured to ignore the logical identifier field when comparing the identities associated with the received transaction requests.

12. The device according to claim 10, wherein the arbiter is configured to ignore the real identifier field when comparing the identities associated with the received transaction requests.

13. The device according to claim 1, wherein an arbiter is configured to change during operation between comparing the importance level values associated with received transaction requests, and comparing the identifies associated with received transaction requests, for determining a winning transaction request.

14. The device according to claim 1, wherein a component comprises at least one bus port and wherein said at least one bus port is a source of a transaction request.

15. The device according to claim 1, further comprising a memory configured to maintain a list of importance level values and wherein the priority value associated with a transaction request comprises an importance level value from said list.

16. The device according to claim 1, further comprising a memory configured to maintain a list of identities of entities configured to generate transaction requests.

17. The device according to claim 1, wherein the resource is configured to carry out arbitration of transaction requests it receives, when it is necessary to transfer those transaction requests to another resource, based on said priority values associated with said transaction requests.

18. A method of controlling access to a resource by a plurality of components in an integrated circuit device that comprises a plurality of arbiters arranged in at least two levels of arbitration, the method comprising:
   wherein the plurality of components are organized in a fixed plurality of distinct groups, each arbiter of a first level connected to exactly one group by at least one bus;
   receiving, at different arbiters of the first level, transaction requests for access to the resource from the respective groups of components;
   comparing, at each arbiter of the first level, priority values associated with each transaction request received; wherein the priority values comprise a field with an identity of a source of the transaction request and a field with an importance level value associated with the transaction request;
   forwarding a winning transaction request, as determined from said comparison, and its associated priority value from each arbiter of the first level to at least one arbiter of a second level;
   receiving, at an arbiter of a last level, transaction requests from different arbiters of a previous level;
   comparing, at the arbiter of the last level, priority values associated with each transaction request received; and
   forwarding a winning transaction request, as determined from said comparison at the arbiter of the last level, from the arbiter of the last level to the resource.

19. The method according to claim 18, further comprising generating the transaction requests by applications run on one of said components.

20. The method according to claim 19, wherein, if one or more threads are executed by an application, then said one or more threads generate transaction requests.

21. The method according to claim 18, wherein comparing priority values at an arbiter comprises comparing the importance level values associated with received transaction requests and wherein forwarding comprises forwarding as the winning transaction request the transaction request with the highest importance level value.

22. The method according to claim 21, wherein, if there are at least two transaction requests with equal and highest importance level values, said comparing comprises comparing the identities associated with the at least two transaction requests and said forwarding comprises forwarding as the winning transaction request the transaction request with the identity most significant to the operation of the device.

23. The method according to claim 18, wherein comparing priority values at an arbiter comprises comparing the identities associated with received transaction requests and wherein forwarding comprises forwarding as the winning transaction request the transaction request with the identity most significant to the operation of the device.

24. The method according to claim 23, wherein, if there are at least two transaction requests with identities that are equal and of highest significance, said comparing comprises comparing the importance level values associated with the at least two transaction requests and said forwarding comprises forwarding as the winning transaction request the transaction request with the highest importance level value.

25. The method according to claim 23, wherein the field of the priority value for a transaction request that is associated with an identity comprises a real identifier field and a logical identifier field, wherein the real identifier field relates to a component of the device that generated the transaction request and the logical identifier field relates to an application thread run on that component.

26. The method according to claim 25, wherein said comparing comprises ignoring the logical identifier field.

27. The method according to claim 25, wherein said comparing comprises ignoring the real identifier field.

28. The method according to claim 18, further comprising changing during operation of an arbiter between comparing the importance level values associated with received transaction requests, and comparing the identifies associated with received transaction requests, for determining a winning transaction request.

29. The method according to claim 18, wherein the resource is configured to carry out arbitration of transaction requests it receives, when it is necessary to transfer those transaction requests to another resource, based on said priority values associated with said transaction requests.

* * * * *